(12) United States Patent
Adams, Jr.

(10) Patent No.: US 6,224,773 B1
(45) Date of Patent: May 1, 2001

(54) WASTEWATER TREATMENT SYSTEM WITH ENHANCED DIRECTIONAL FLOW

(75) Inventor: Carl E. Adams, Jr., Brentwood, TN (US)

(73) Assignee: The Advent Corporation, Brentwood, TN (US)

( * ) Notice: Subject to any disclaimer, the term of this patent is extended or adjusted under 35 U.S.C. 154(b) by 0 days.

(21) Appl. No.: 09/415,530

(22) Filed: Oct. 8, 1999

(51) Int. Cl.$^7$ ................................................ C02F 3/20
(52) U.S. Cl. .................... 210/626; 210/629; 210/800; 210/195.4; 210/197; 210/519; 210/532.1
(58) Field of Search .................... 210/621, 623, 210/626, 629, 800, 195.1, 195.3, 195.4, 197, 256, 258, 519, 532.1

(56) References Cited

U.S. PATENT DOCUMENTS

| 828,515 | * | 8/1906 | Schmidt | 210/519 |
|---|---|---|---|---|
| 3,366,242 | * | 1/1968 | Nicol | 210/197 |
| 3,507,393 | * | 4/1970 | Weis et al. | 210/195.4 |
| 3,744,637 | * | 7/1973 | Ziegler | 210/195.4 |
| 3,807,563 | * | 4/1974 | Reid, Jr. | 210/197 |
| 3,834,540 | * | 9/1974 | Bernard | 210/195.4 |
| 4,093,549 | * | 6/1978 | Wilson | 210/195.4 |
| 5,032,276 | * | 7/1991 | Mackrle et al. | 210/195.3 |
| 5,196,114 | * | 3/1993 | Burwell | 210/197 |
| 5,569,376 | * | 10/1996 | Graves | 210/195.4 |
| 5,766,459 |   | 6/1998 | Adams, Jr. | 210/195.4 |
| 5,830,351 |   | 11/1998 | Adams, Jr. | 210/195.4 |

FOREIGN PATENT DOCUMENTS

441302 * 8/1912 (FR) .

* cited by examiner

Primary Examiner—Christopher Upton
(74) Attorney, Agent, or Firm—R. Neil Sudol; Henry D. Coleman

(57) ABSTRACT

A wastewater treatment system has a tank and at least one baffle disposed in the tank so as to subdivide the tank to form a treatment chamber and a clarification or settling chamber. The baffle is inclined relative to vertical, so that the clarification chamber tapers from an upper end to a lower end. The lower end of the clarification chamber is provided with a plurality of mutually spaced orifices or apertures communicating with a lower region of the treatment chamber, so that sludge settling in the clarification chamber is directed to the lower region of the treatment chamber via the orifices. The clarification chamber is further provided at its lower end with a plurality of substantially vertical partitions defining a plurality of hoppers communicating with respective orifices for guiding sludge to the orifices. A recycle pump and a distribution manifold serve to recycle wastewater from the treatment chamber to the clarification chamber. The distribution manifold is provided at an outlet side with a plurality of spaced vertical nozzle pipes disposed in the clarification chamber.

19 Claims, 2 Drawing Sheets

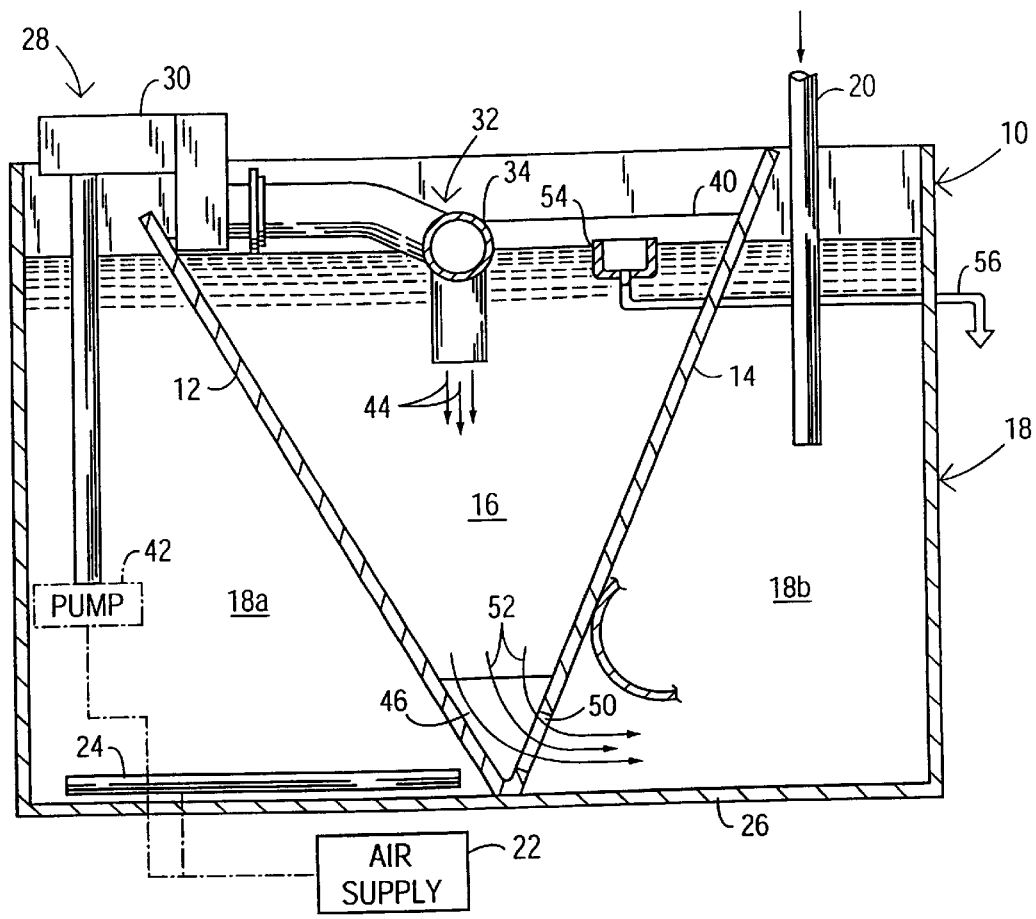
FIG. 1
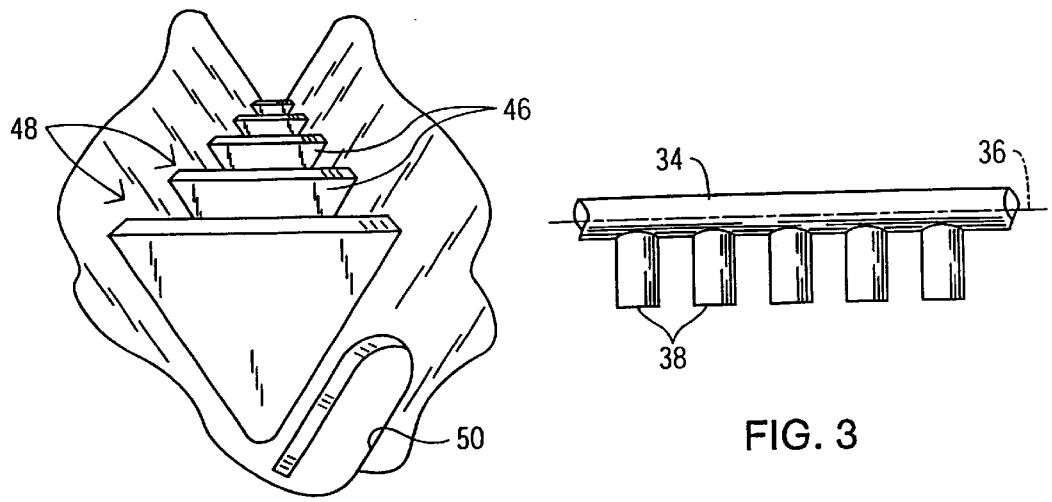
FIG 2
FIG. 3

WASTEWATER TREATMENT SYSTEM WITH ENHANCED DIRECTIONAL FLOW

BACKGROUND OF THE INVENTION

This invention relates to wastewater treatment systems, and more particularly to a system having a vessel or tank with integral treatment and settling chambers.

In a common type of wastewater treatment system, wastewater is treated by aeration in a first tank. Wastewater from this treatment or aeration tank is delivered to a second tank where settling of sludge components is allowed to occur. A lower end of this settling or clarification tank is connected to a lower end of the aeration or treatment tank.

U.S. Pat. Nos. 5,766,459 and 5,830,351 to Carl E. Adams, Jr., disclose such an activated sludge system wherein the clarification and aeration tanks are chambers in the same vessel. The chambers are defined or separated by an inclined baffle plate so that the clarification chamber tapers in a downward direction to funnel the sludge towards an opening or gap at the lower end of the baffle. The sludge moves through the gap into a lower region of the aeration chamber, propelled in part by a recycle pump which draws wastewater from the aeration chamber and delivers the wastewater to the upper surface of a cylindrical or rectangular well located at the upper end of the clarification chamber. The center well serves to direct the delivered recycled wastewater in a downward direction through the clarification chamber.

In particular embodiments of these integral wastewater treatment systems, the baffle and consequently the clarification chamber may have a conical or rectangular configuration. The clarification chamber tapers at its base to a narrow throat where the sludge reenters the aeration chamber. In certain configurations, it has been noticed that the gap extending between the narrow throat at the base of the clarification chamber and the lower region of the aeration chamber, although narrow and designed to maintain a downward and outward velocity, permits miscellaneous and unpredictable backmixing generating of undesirable upward currents into the clarification chamber. These upward currents interfere with an even distribution of the returning or settling sludge in the clarification chamber and, in some cases, cause a bridging or accumulation of sludge at the base of the clarification chamber. The bridging in turn can result in floating sludge on the surface of the clarification pool. Although the floating sludge does not impair proper operation of the wastewater treatment system, that phenomenon does present an aesthetic drawback.

SUMMARY OF THE INVENTION

The present invention is directed to an improved wastewater treatment system of the above-described type. More specifically, the present invention is directed to providing a solution to the problem of backmixing and undesirable upward currents in the clarification chamber of a wastewater treatment system. The present invention introduces improvements into the design of an integral type wastewater treatment system for the purpose of enhancing directional flow of wastewater in the clarification chamber and between the clarification chamber and the aeration chamber.

A wastewater treatment system in accordance with the present invention comprises a tank and at least one baffle disposed in the tank so as to subdivide the tank to form a treatment chamber and a clarification or settling chamber. The baffle is preferably inclined relative to vertical, so that the clarification chamber tapers from an upper end to a lower end. The lower end of the clarification chamber is provided with a plurality of mutually spaced orifices or apertures communicating with a lower region of the treatment chamber, so that sludge settling in the clarification chamber is directed to the lower region of the treatment chamber via the orifices.

It is contemplated that the settling sludge passes from the base or lower end of the clarification chamber to the lower region of the treatment chamber solely through the orifices. These orifices collectively function as a bottle neck to constrict the cross-sectional area of the flow path from the clarification chamber to the treatment chamber. Accordingly, the velocity of the sludge entering the treatment chamber is increased with respect to prior wastewater treatment tank designs.

Pursuant to another feature of the present invention, the clarification chamber is provided at its lower end with a plurality of substantially vertical partitions defining a plurality of hoppers communicating with respective orifices for guiding sludge to the orifices. Where the lower end of the clarification chamber is elongate and has an axial or longitudinal dimension, the partitions extend substantially perpendicularly to the axial or longitudinal dimension. Where the clarification chamber is annular, the partitions extending radially. In general, the hoppers are equal in number to the orifices.

The hoppers facilitate a uniform feeding of sludge to the various orifices and ensure that the orifices receive a substantially constant continuous supply of sludge. The uniform and continuous feeding of sludge to the orifices assists in preventing any backflow currents. The uniform and continuous feeding of sludge may be enhanced by shaping the hoppers to optimally funnel settling sledge to the orifices. For example, the hoppers may taper down to the orifices.

In accordance with a further feature of the present invention, the wastewater treatment system further comprises a recycle pump and a distribution manifold. The pump serves to recycle wastewater from the treatment chamber to the clarification chamber and accordingly communicates at an inlet end with the treatment chamber. The distribution manifold is connected to an outlet end of the recycle pump and is provided at an outlet side with a plurality of spaced vertical nozzle pipes.

Preferably, the nozzle pipes have outlet ends disposed in the clarification chamber. A common conduit of the manifold may also be at least partially disposed in the clarification chamber. More specifically, the outlet ends of the nozzle pipes and at least a portion of the common conduit of the manifold are located in the wastewater/sludge pool in the clarification chamber.

Where the clarification chamber has an axial or longitudinal dimension, the nozzle pipes are preferably spaced from one another along the axial or longitudinal dimension. Where the clarification chamber is annular, the nozzle pipes are preferably disposed along a circular arc.

The provision of multiple vertical nozzle pipes facilitates a discharge of recycled wastewater in a downward direction and thus enhances the unidirectional downward flow of sludge in the clarification chamber.

In accordance with an additional feature of the present invention, the recycle pump and the orifices are sized so that a sludge mixture passing from the lower end of the clarification chamber to the lower region of the treatment chamber via the orifices has a velocity sufficiently great to substantially prevent backflow currents from the lower region of the treatment chamber to the lower end of the clarification chamber. More specifically, the recycle pump and the orifices are sized so that a sludge mixture passing from the lower end of the clarification chamber to the lower region of the treatment chamber via the orifices has a velocity of at least 10 cm per second and more preferably 15 cm per second or greater.

The hopper partitions and the wall structure surrounding the orifices may be made of any material that is resistant to the constituents of wastewater. Such materials include grout, steel or plastic.

The orifices and hopper partitions of the present invention can be retrofit to existing wastewater installations. Accordingly, the present invention is also directed to a method for modifying an existing wastewater installation to produce the benefits of the present invention, where the existing wastewater treatment system generally comprises a tank and at least one baffle disposed in the tank and subdividing the tank to form a treatment chamber and a clarification chamber. The baffle is inclined relative to vertical so that the clarification chamber tapers from an upper end to a lower end. The lower end of the clarification chamber communicates with a lower region of the treatment chamber via a gap, usually an opening or gap at the lower edge of the baffle. The modification includes installing at least one panel at a lower end of the baffle to define, at the lower end of the clarification chamber, a plurality of mutually spaced orifices communicating with a lower region of the treatment chamber. Then, sludge settling in the clarification chamber is directed through the orifices so that the sludge in entering the lower region of the treatment chamber has an increased velocity to at least substantially prevent backflow currents flowing from the lower region of the treatment chamber to the lower end of the clarification chamber.

Preferably, the modification method further includes disposing, at the lower end of the clarification chamber, a plurality of substantially vertical partitions to define a plurality of hoppers communicating with respective ones of the orifices. The directing of the sludge through the orifices then includes guiding the sludge to the orifices via respective hoppers.

The method may further comprise operating a recycle pump operatively connected at an inlet end to the treatment chamber and at an outlet end to the clarification chamber so that a sludge mixture passing from the lower end of the clarification chamber to the lower region of the treatment chamber via the orifices has a velocity sufficiently great to substantially prevent backflow currents from the lower region of the treatment chamber to the lower end of the clarification chamber. That velocity is preferably at least 10 cm per second, more preferably at least 15 cm per second or greater.

A retrofit of an existing wastewater treatment installation may be effectuated on site by customized construction. Alternatively or additionally, modular inserts such as base panels and hopper partitions may be provided for facilitating the retrofit process.

BRIEF DESCRIPTION OF THE DRAWINGS

FIG. 1 is a schematic cross-sectional view, taken along a vertical plane, of a wastewater treatment system in accordance with the present invention, showing a tapering clarification tank or chamber. In this configuration, the clarification chamber divides an unaerated but mixed "anoxic" chamber from an aerated "aerobic" chamber.

FIG. 2 is a schematic perspective view showing a row of hoppers at a base of the clarification chamber of FIG. 1.

FIG. 3 is a partial side elevational view of a recycle manifold shown in FIG. 1.

DESCRIPTION OF THE PREFERRED EMBODIMENTS

Figure 4:
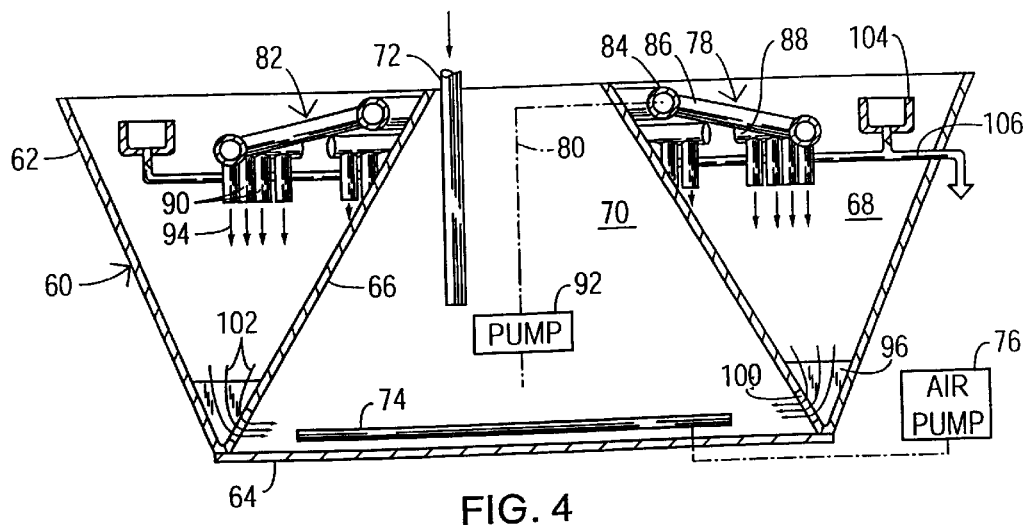
FIG. 4 is a schematic cross-sectional view, taken along a vertical plane, of another wastewater treatment system in accordance with the present invention.

As illustrated in FIG. 1, a wastewater treatment system comprises a tank 10 containing a pair of oppositely inclined planar baffle plates 12 and 14 converging toward one another at their lower ends to define a downwardly tapering wedge-shaped clarification or settling chamber 16. Plates 12 and 14 subdivide the interior of tank 10 into clarification chamber 16, an aeration or aerobic chamber 18a, and an unaerated but mixed anoxic chamber 18b. Chambers 18a and 18b together form a two-lobe treatment chamber or compartment and are interconnected near the top of tank 10 by a gravity conduit or channel 55 through which wastewater overflows from chamber 18b to chamber 18a.

In the embodiment shown in FIG. 1, an inlet conduit 20 extends into anoxic chamber 18b for delivering raw sewage or wastewater thereto. The delivered sewage is subjected to anoxic unaerated treatment in chamber 18b by mixing with recycled sludge from clarification chamber 16. The partially treated water in anoxic chamber 18b flows by gravity (or, alternatively, is pumped) to aerobic chamber 18a for continued aerobic treatment. Air is fed to a lower region of aeration chamber 18a via an air supply 22, which may include a compressor or blower, and a pipe or pipe network 24 disposed along a floor 26 of tank 10.

Treated wastewater is transported from aeration chamber 18a to clarification chamber 16 by a recycling assembly 28 including a conduit 30 extending from aeration chamber 18a to a distribution manifold 32 (FIGS. 1 and 3). Manifold 32 includes a main pipe 34 disposed in an upper region of clarification chamber 16 and extending parallel to a longitudinal axis 36 thereof. Descending from main pipe 34 of manifold 32 are a row of vertical nozzles or outlet pipe sections 38. Nozzles or pipe sections 38 are completely disposed in a clarification pool (not separately labeled) having an upper level or surface 40. Main pipe 34 of manifold 32 may be partially or completely submerged in the clarification pool.

Recycling assembly 28 includes an air-lift-type recycle pump 42 disposed in conduit 30 for lifting wastewater from aeration chamber 18a and moving the wastewater along conduit 30 and out through outlet pipe sections 38. As indicated by arrows 44, the discharge from pipe sections 38 is vertically and uniformly downward. Horizontal velocity components of the recycled wastewater exiting outlet pipe sections 38 have been significantly reduced relative to prior art wastewater treatment installations where wastewater from the aeration chamber is discharged into a well located at the upper end of the clarification chamber.

As illustrated in FIGS. 1 and 2, clarification chamber 16 is provided along a lower end or base with a row of parallel vertical partitions 46 defining a series of adjacent hoppers 48 arranged in a linear array extending parallel to the longitudinal dimension or axis 36 of clarification chamber 18. Partitions 46 are oriented orthogonally or perpendicularly to axis 36.

Hoppers 48 communicate with a lower region of aeration chamber 18 via respective orifices 50. Orifices 50 are arranged at the lower edge of baffle plate 14, along bottom wall or floor 26 of tank 10, so that all of the sludge in each hopper 48 is directed through the respective orifice 50 into aeration chamber 18.

As indicated by arrows 52 in FIG. 1, sludge settling in clarification chamber 16 falls into hoppers 48 and passes therefrom to the lower region of anoxic chamber 18*b* solely through orifices 50. Orifices 50 are spaced from one another so as to constrict the cross-sectional area of the flow path from clarification chamber 16 to anoxic chamber 18*b* relative to the flow path in prior art wastewater treatment tanks. This restriction of the sludge flow path by orifices 50 increases the velocity of the sludge entering anoxic chamber 18*b* with respect to the prior designs and inhibits the formation backflow currents from the lower region of anoxic chamber 18*b* into the base of clarification chamber 16.

Hoppers 48 facilitate a uniform feeding of sludge to orifices 50 and ensure that the orifices receive a substantially constant continuous supply of sludge. The uniform and continuous feeding of sludge to orifices 50 assists in preventing backflow currents. To facilitate or enhance the continuous feeding of sludge to orifices 50, hoppers 48 may be shaped to funnel settling sledge to the orifices. For example, partitions 46 may have a width which increases in a direction towards floor 26 of tank 10 so that hoppers 48 taper down to orifices 50. The bottom or floor of each hopper 48 may be sloped downwardly towards the respective orifice 50 so that the lower edge of the respective orifice 50 is at the lowest point of the hopper's floor.

Clarified wastewater is removed from clarification chamber 16 by spilling over into a weir 54 located at upper pool surface 40. The wastewater collected by weir 54 is conveyed away via an effluent conduit 56.

It is contemplated that partitions 46, hoppers 48, and orifices 50 may be added or inserted in existing wastewater treatment systems. In a retrofit installation, hopper partitions 46 and the wall structure surrounding and defining orifices 50 may be made of any material, e.g., grout, steel or plastic, that is resistant to the constituents of wastewater.

Figure 5:
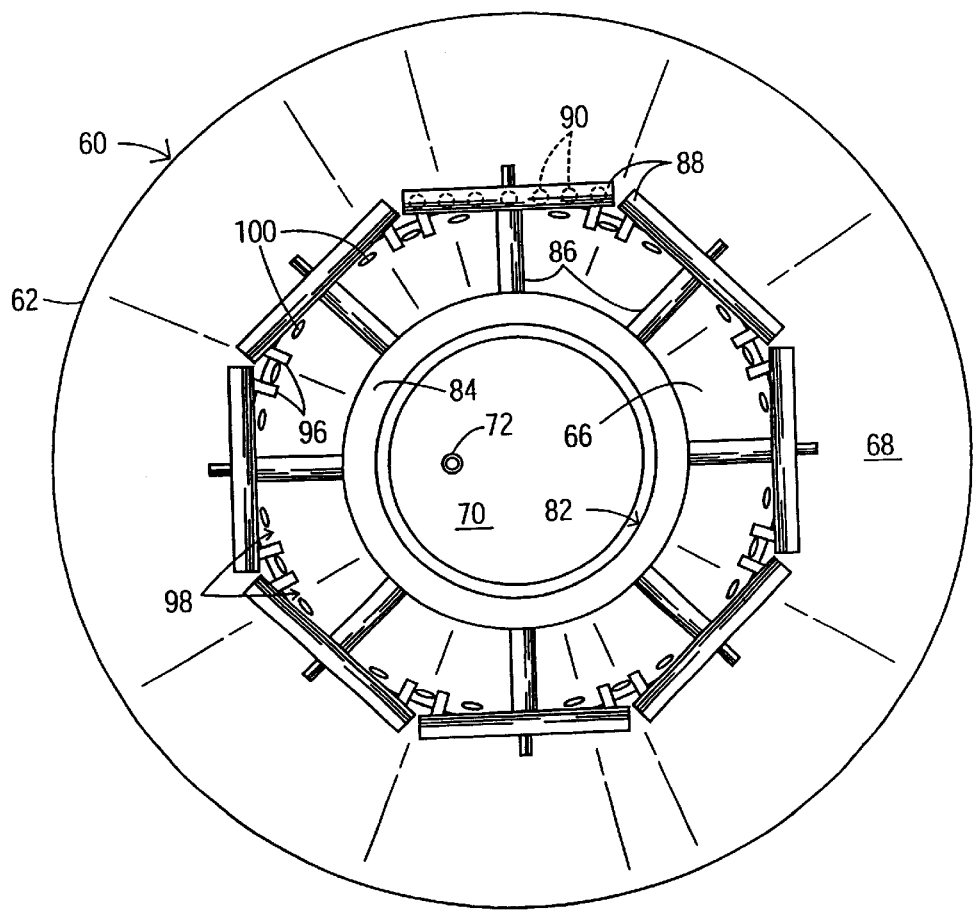
FIG. 5 is a top plan view of the wastewater treatment system of FIG. 4.

The wastewater treatment system of FIGS. 4 and 5 includes a tank 60 having a conical outer wall 62 and a circular floor or base 64. Conical wall 62 is inclined so as to converge in a downward direction. Thus, conical wall 62 has a greater diameter at an upper end than at a lower end. The interior of tank 60 contains a conical baffle 66 which is inclined so as to diverge in a downward direction towards the lower edge of conical outer wall 62 so as to form, with outer wall 62, an annular clarification chamber 68 of a substantially triangular cross-section. Conical baffle 66 subdivides the interior of tank 60 into clarification chamber 68 and a central aeration or treatment chamber 70.

An inlet conduit 72 partially disposed in aeration chamber 70 conveys raw sewage or wastewater thereto. The incoming sewage is mechanically and chemically treated by air bubbled through the chamber from a network of pipes 74 (FIG. 4 only) located along floor or base 64. Pipes 74 are supplied with pressurized air by a pump 76.

Treated wastewater is transported from aeration chamber 70 to clarification chamber 68 by a recycling assembly 78 including a conduit 80 (FIG. 4 only) extending from aeration chamber 70 to a distribution manifold 82. Manifold 82 includes a circular central conduit or hub 84 disposed in an upper radially inner region of clarification chamber 68. Manifold 82 further includes a plurality of radially oriented distribution conduits or spokes 86 extending from central conduit or hub 84 on a radially inner side to respective elongate hollow carrier pipes 88 arranged in a polygonal configuration as shown in FIG. 5. As shown in FIG. 4, each carrier pipe 88 supports a row of vertical nozzles or outlet pipe sections 90. Nozzles or pipe sections 90 are completely disposed in a clarification pool (not separately labeled) in clarification chamber 68. Central conduit or hub 84 of manifold 82 may be partially or completely submerged in the clarification pool.

Wastewater recycling assembly 78 includes a recycle pump 92 operatively connected to conduit 80 for drawing wastewater from aeration chamber 70 and transporting the wastewater to and through central conduit or hub 84, radially outwardly along distribution conduits or spokes 86, essentially tangentially along carrier pipes 88, and vertically downwardly through outlet pipe sections 90. As indicated by arrows 94, the discharge from pipe sections 90 is substantially uniformly downward. The elimination of any significant horizontal velocity components in the recycled wastewater exiting outlet pipe sections 38 and 90 contributes to an essentially unidirectional flow of sludge-laden wastewater through the treatment systems, that is, a flow without substantial reverse currents or backflows.

As illustrated in FIGS. 4 and 5, clarification chamber 68 is provided along a lower end or base with a circular array of radially oriented vertical partitions 96 defining a series of adjacent hoppers 98 arranged in a circular array. Hoppers 98 communicate with a lower region of aeration chamber 70 via respective apertures or orifices 100. Orifices 100 are arranged at the lower edge of baffle plate 66, along bottom wall or floor 64 of tank 60, so that all of the sludge settling in each hopper 98 becomes channeled through the respective orifice 100 into aeration chamber 70.

As indicated by arrows 102 in FIG. 4, sludge in clarification chamber 68 descends into hoppers 98 and passes therefrom to the lower region of aeration chamber 70 solely through orifices 100. Orifices 100 are spaced from one another so as to constrict the cross-sectional area of the flow path from clarification chamber 68 to aeration chamber 70 relative to the flow path in prior art wastewater treatment tanks. This restriction of the sludge flow path by orifices 100 increases the velocity of the sludge entering aeration chamber 70 with respect to the prior designs and inhibits the formation backflow currents from the lower region of aeration chamber 70 into the base of clarification chamber 68.

Hoppers 98 facilitate a uniform feeding of sludge to orifices 100 and ensure that the orifices receive a substantially constant continuous supply of sludge. The uniform and continuous feeding of sludge to orifices 100 assists in preventing backflow currents. To facilitate or enhance the continuous feeding of sludge to orifices 100, hoppers 98 may be shaped to funnel settling sledge to the orifices. For example, partitions 96 may have a width which increases in a direction towards floor 64 of tank 60 so that hoppers 98 taper down to orifices 100. The bottom or floor of each hopper 98 may be sloped downwardly towards the respective orifice 100 so that the lower edge of the respective orifice 100 is at the lowest point of the hopper's floor.

Clarified wastewater is removed from clarification chamber 68 by spilling over into a weir 104 (FIG. 4 only) located at the surface of the wastewater pool in clarification chamber 68. The wastewater collected by weir 104 is conveyed away via an effluent conduit 106 (FIG. 4 only).

The wastewater treatment systems of FIGS. 1–3 and FIGS. 4 and 5 operate basically as described in U.S. Pat. Nos. 5,766,459 and 5,830,351, the disclosures of which are hereby incorporated by reference. The operations of the wastewater systems disclosed herein are modified to ensure a minimum velocity of sludge passing through orifices 50 and 100 into the lower regions of aeration chambers 18 and 70. More particularly, recycle pumps 42, 92 and orifices 50, 100 are sized so that a sludge mixture passing from clarification chambers 16, 68 to the lower regions of aeration chambers 18, 70 via the orifices has a velocity sufficiently great to effectively inhibit or prevent backflow currents from aeration chambers 18, 70 to clarification chamber 16, 68 via orifices 50, 100. The velocity of the sludge passing through orifices 50, 100 is preferably at least 10 cm per second and more preferably 15 or greater.

Although the invention has been described in terms of particular embodiments and applications, one of ordinary skill in the art, in light of this teaching, can generate additional embodiments and modifications without departing from the spirit of or exceeding the scope of the claimed invention. For example, in the embodiment of FIGS. 4 and 5, wastewater distribution manifold 82 may have any of a number of equivalent configurations. Spokes 86 and carrier pipes 88 may be eliminated so that pipe sections 90 depend directly from a toroidal distribution conduit located vertically above the array of partitions 96 and hoppers 98. This configuration is closely analogous to manifold 32 of the linear configuration of FIGS. 1–3. Alternatively, carrier pipes 88 may be eliminated and spokes 86 multiplied so that each pipe section 90 is supported and supplied by a respective dedicated spoke.

A wastewater treatment system in accordance with the present invention may have a central conical clarification chamber tapering down to a neck as disclosed in U.S. Pat. Nos. 5,766,459 and 5,830,351. In that case, a lower portion or the neck is provided with a plurality of spaced apertures or orifices communicating with the lower end of the surrounding aeration or treatment chamber. In addition, the neck is provided at its base with a plurality of radial partitions defining a multiplicity of hoppers equal in number to the orifices, for guiding settling sludge to the respective orifices.

Accordingly, it is to be understood that the drawings and descriptions herein are proffered by way of example to facilitate comprehension of the invention and should not be construed to limit the scope thereof.

What is claimed is:

1. A wastewater treatment system comprising:
   a tank; and
   at least one baffle disposed in said tank and subdividing said tank to form a treatment chamber and a clarification chamber, a lower end of said clarification chamber being provided with a plurality of spaced orifices communicating with a lower region of said treatment chamber, so that sludge settling in said clarification chamber is directed to said lower region of said treatment chamber via said orifices,
   said clarification chamber being provided at said lower end with a plurality of substantially vertical partitions defining a plurality of hoppers communicating with respective ones of said orifices for guiding sludge to said orifices.

2. The wastewater treatment system defined in claim 1 wherein said lower end of said clarification chamber is elongate and has an axial or longitudinal dimension, said partitions extending substantially perpendicularly to said axial or longitudinal dimension.

3. The wastewater treatment system defined in claim 1 wherein said clarification chamber is annular, said partitions extending radially.

4. The wastewater treatment system defined in claim 1 wherein said hoppers are equal in number to said orifices.

5. The wastewater treatment system defined in claim 1 wherein said baffle is inclined relative to vertical, said clarification chamber tapering from an upper end to a lower end.

6. The wastewater treatment system defined in claim 1 wherein said lower end of said clarification chamber communicates directly with said lower region of said treatment chamber via said orifices only.

7. A wastewater treatment system comprising:
   a tank;
   at least one baffle disposed in said tank and subdividing said tank to form a treatment chamber and a clarification chamber, a lower end of said clarification chamber being provided with a plurality of spaced orifices communicating with a lower region of said treatment chamber, so that sludge settling in said clarification chamber is directed to said lower region of said treatment chamber via said orifices;
   a recycle pump for recycling wastewater from said treatment chamber to said clarification chamber, said pump communicating at an inlet end with said treatment chamber; and
   a distribution manifold connected to an outlet end of said recycle pump and provided at an outlet side with a plurality of spaced vertical nozzle pipes.

8. The wastewater treatment system defined in claim 7 wherein said nozzle pipes have outlet ends disposed in said clarification chamber.

9. The wastewater treatment system defined in claim 7 wherein said clarification chamber has an axial or longitudinal dimension, said nozzle pipes being spaced from one another along said axial or longitudinal dimension.

10. The wastewater treatment system defined in claim 7 wherein said clarification chamber is annular, said nozzle pipes being disposed along a circular arc.

11. A wastewater treatment system comprising:
    a tank;
    at least one baffle disposed in said tank and subdividing said tank to form a treatment chamber and a clarification chamber, a lower end of said clarification chamber being provided with a plurality of spaced orifices communicating with a lower region of said treatment chamber, so that sludge settling in said clarification chamber is directed to said lower region of said treatment chamber via said orifices; and
    a recycle pump operatively connected at an inlet end to said treatment chamber and at an outlet end to said clarification chamber, said recycle pump and said orifices being sized so that a sludge mixture passing from said lower end of said clarification chamber to said lower region of said treatment chamber via said orifices has a velocity sufficiently great to substantially prevent backflow currents from said lower region of said treatment chamber to said lower end of said clarification chamber.

12. The wastewater treatment system defined in claim 11 wherein said recycle pump and said orifices are sized so that a sludge mixture passing from said lower end of said clarification chamber to said lower region of said treatment chamber via said orifices has a velocity of at least 10 cm per second.

13. A wastewater treatment system comprising:
    a tank;
    at least one baffle disposed in said tank and subdividing said tank to form a treatment chamber and a clarification chamber, a lower end of said clarification chamber being provided with a plurality of spaced orifices communicating with a lower region of said treatment chamber, so that sludge settling in said clarification chamber is directed to said lower region of said treatment chamber via said orifices;

an inlet conduit connecting said treatment chamber to a source of wastewater;

an effluent conduit extending from said clarification chamber for removing treated wastewater therefrom; and a recycle pump operatively connected at an inlet end to said treatment chamber and at an outlet end to said clarification chamber for recycling wastewater from said treatment chamber to said clarification chamber, said inlet conduit, said effluent conduit, said recycle pump and said orifices being sized so that a sludge mixture passing from said lower end of said clarification chamber to said lower region of said treatment chamber via said orifices has a velocity sufficiently great to substantially prevent backflow currents from said lower region of said treatment chamber to said lower end of said clarification chamber.

14. The wastewater treatment system defined in claim 13 wherein said recycle pump and said orifices are sized so that a sludge mixture passing from said lower end of said clarification chamber to said lower region of said treatment chamber via said orifices has a velocity of at least 10 cm per second.

15. A method for reducing backflow currents in a wastewater treatment system comprising a tank and at least one baffle disposed in said tank and subdividing said tank to form a treatment chamber and a clarification chamber, a lower end of said clarification chamber communicating via a gap with a lower region of said treatment chamber, said method comprising:

installing at least one panel at a lower end of said baffle to define, at said lower end of said clarification chamber, a plurality of mutually spaced orifices communicating with a lower region of said treatment chamber;

directing, through said orifices, sludge settling in said clarification chamber so that said sludge in entering said lower region of said treatment chamber has an increased velocity to at least substantially prevent backflow currents flowing from said lower region of said treatment chamber to said lower end of said clarification chamber and so that currents flow through all of said orifices in one direction only, from said lower region of said clarification chamber to said lower region of said treatment chamber.

16. The wastewater treatment system defined in claim 15 wherein said baffle is inclined relative to vertical, said clarification chamber tapering from an upper end to a lower end.

17. The method defined in claim 15, further comprising:

disposing, at said lower end of said clarification chamber, a plurality of substantially vertical partitions to define a plurality of hoppers communicating with respective ones of said orifices, the directing of said sludge through said orifices including guiding said sludge to said orifices via respective ones of said hoppers.

18. The method defined in claim 15, further comprising operating a recycle pump operatively connected at an inlet end to said treatment chamber and at an outlet end to said clarification chamber so that a sludge mixture passing from said lower end of said clarification chamber to said lower region of said treatment chamber via said orifices has a velocity of at least 10 cm per second.

19. A method for reducing backflow currents in a wastewater treatment system comprising a tank and at least one baffle disposed in said tank and subdividing said tank to form a treatment chamber and a clarification chamber, a lower end of said clarification chamber communicating via a gap with a lower region of said treatment chamber, said method comprising:

installing at least one panel at a lower end of said baffle to define, at said lower end of said clarification chamber, a plurality of mutually spaced orifices communicating with a lower region of said treatment chamber;

directing, through said orifices, sludge settling in said clarification chamber so that said sludge in entering said lower region of said treatment chamber has an increased velocity to at least substantially prevent backflow currents flowing from said lower region of said treatment chamber to said lower end of said clarification chamber; and operating a recycle pump operatively connected at an inlet end to said treatment chamber and at an outlet end to said clarification chamber so that a sludge mixture passing from said lower end of said clarification chamber to said lower region of said treatment chamber via said orifices has a velocity sufficiently great to substantially prevent backflow currents from said lower region of said treatment chamber to said lower end of said clarification chamber.

* * * * *